(12) United States Patent
Tsuzuki et al.

(10) Patent No.: US 6,798,922 B1
(45) Date of Patent: Sep. 28, 2004

(54) IMAGE TRANSMISSION METHOD AND IMAGE TRANSMISSION DEVICE FOR REALIZING THE SAME

(75) Inventors: Kengo Tsuzuki, Machida (JP); Toshiaki Shinohara, Omiya (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/743,452

(22) PCT Filed: Jul. 30, 1999

(86) PCT No.: PCT/JP99/04111

§ 371 (c)(1), (2), (4) Date: Jan. 10, 2001

(87) PCT Pub. No.: WO00/07359

PCT Pub. Date: Feb. 10, 2000

(30) Foreign Application Priority Data

Jul. 31, 1998 (JP) .......................... 10-229513

(51) Int. Cl.⁷ .......................... G06K 9/20; H04N 1/387
(52) U.S. Cl. .......................... 382/282; 382/286; 358/453
(58) Field of Search .......................... 382/282, 291, 382/305, 173, 190, 203, 286; 358/449, 453, 1.16

(56) References Cited

U.S. PATENT DOCUMENTS 5,677,981 A * 10/1997 Kato et al. .................. 386/112
6,026,185 A * 2/2000 Kujirai ........................ 382/199
6,157,650 A * 12/2000 Okuyama et al. ........... 370/401

FOREIGN PATENT DOCUMENTS

| JP | 63-300673 A | 12/1988 |
| JP | 2-50673 A | 2/1990 |
| JP | 2-306765 A | 12/1990 |
| JP | 10-32683 A | 2/1998 |

* cited by examiner

Primary Examiner—Kanji Patel
(74) Attorney, Agent, or Firm—Connolly Bove Lodge & Hutz LLP

(57) ABSTRACT

According to the present invention, it is designed in such manner that a designation minimum unit for designating a position of an effective region of an image transmitted from a camera and a designation minimum unit for designating a size of the effective region are set independently from each other so that a restriction on one of them is not extended or applied to the other. Apart from designation minimum units (C, D) for determining the extent of an image region to be transmitted (effective region), designation minimum units (I, J) for determining position of the effective region are set to values irrelevant to the designation minimum units for determining the extent of the effective region. As a result, even when there is a restriction on the setting of one of the designation minimum units, i.e. either the designation minimum unit for designating the position of the effective region or the designation minimum unit for designating the size of the effective region, it can be set in such manner that the restriction applied to one of them is not extended or applied to the other.

13 Claims, 8 Drawing Sheets

FIG. 1B

PARAMETERS IN EFFECTIVE REGION DESIGNATING METHOD (1) MAXIMUM VALUE OF THE EXTENT OF EFFECTIVE REGION (A: HORIZONTAL DIRECTION;    B: VERTICAL DIRECTION)

(2) DESIGNATION MINIMUM UNIT OF THE EXTENT OF EFFECTIVE REGION (C: HORIZONTAL DIRECTION;    D: VERTICAL DIRECTION)

(3) POSITION OF EFFECTIVE REGION (E: HORIZONTAL DIRECTION;    F: VERTICAL DIRECTION)

(4) SIZE OF EFFECTIVE REGION (G: HORIZONTAL DIRECTION;    H: VERTICAL DIRECTION)

(5) DESIGNATION MINIMUM UNIT OF POSITION OF EFFECTIVE REGION (I: HORIZONTAL DIRECTION;    J: VERTICAL DIRECTION)

$A = C \times n1$;   or        $B = D \times n2$;   or $\quad I \times n7$                    $J \times n8$ $E = I \times n3 < A$         $F = J \times n4 < B$ $G = C \times n5 < A$       $H = D \times n6 < B$ (n1-n8 are integral multiples.)

FIG. 5B "PRIOR ART"

PARAMETERS IN EFFECTIVE REGION DESIGNATING METHOD (1) MAXIMUM VALUE OF THE EXTENT OF EFFECTIVE REGION (A: HORIZONTAL DIRECTION;   B: VERTICAL DIRECTION)

(2) DESIGNATION MINIMUM UNIT OF EFFECTIVE REGION (C' : HORIZONTAL DIRECTION;   D' : VERTICAL DIRECTION)

(3) POSITION OF EFFECTIVE REGION (E: HORIZONTAL DIRECTION;   F: VERTICAL DIRECTION)

(4) SIZE OF EFFECTIVE REGION (G: HORIZONTAL DIRECTION;   H: VERTICAL DIRECTION)

$$A = C' \times n1; \quad \text{or} \quad B = D' \times n2; \quad \text{or}$$
$$E = C' \times n3 < A \quad\quad F = D' \times n4 < B$$
$$G = C' \times n5 < A \quad\quad H = D' \times n6 < B$$

(n1-n6 are integral multiples.)

IMAGE TRANSMISSION METHOD AND IMAGE TRANSMISSION DEVICE FOR REALIZING THE SAME

TECHNICAL FIELD

The present invention relates to an image transmitting method for transmitting image data of a camera such as a digital camera and also to an image transmitting system for carrying out said method. In particular, the invention relates to an image transmitting method for transmitting an arbitrary image region on a picture of a camera, and to an image transmitting system for carrying out said method.

BACKGROUND ART

In the past, as the image transmission mode of this type, a protocol for digital camera for transmitting image data over a network such as IEEE 1394 serial bus has been standardized in 1394TA. In the 1394-based Digital Camera Specification Rev. 1.20, a method for transmitting only the image data in a designated part of the region among the entire image region is defined.

Here, referring to FIG. 5, description will be given on a part of the conventional image transmitting method relating to the present invention. FIG. 5 explains a method for designating an arbitrary image region (which may be all or a part of a picture) on a picture taken by a camera. FIG. 5A is a drawing to show a region on the picture and dimension, and FIG. 5B indicates parameters for designating the region Extent (size) and position (expressed as A, B, C', D', E, F, G, and H) of each portion of the effective region given in the parameters of FIG. 5B represent extent (size) and position of portions shown by each of the corresponding symbols (A–H) in the image region shown in FIG. 5A. That is, a symbol "A" given in (1) of FIG. 5B denotes the maximum value of an extent of an effective region (an image region designated for transmission; the same applies hereinafter.) in horizontal direction. "B" represents the maximum value of an extent of an effective region in vertical direction. A symbol "C'" given in (2) of FIG. 5B represents a designation minimum unit of an effective region in horizontal direction, and "D'" represents a designation minimum unit of the effective region in vertical direction. A symbol "E" given in (3) of FIG. 5B represents a position of an effective region in horizontal direction, and "F" represents a position of the effective region in vertical direction. "G" given in (4) of FIG. 5B represents a size of the effective region in horizontal direction, and "H" represents a size of the effective region in vertical direction.

Next, referring to FIG. 5A and FIG. 5B, operation of the conventional image transmission will be described. First, on a register (not shown) of a camera, the maximum value of an extent of the effective region (A: horizontal direction; B: vertical direction) and a designation minimum unit (C': horizontal direction; D': vertical direction) of the effective region are set. These values are acquired by the control unit, which requests transmission of the image region. Based on the data thus acquired, a position of the effective region (E: horizontal direction; F: vertical direction) and a size of the effective region (G: horizontal direction; H: vertical direction) are determined so that the region is an integral multiple of the designation minimum unit of the effective region and within the maximum value, and these are set on the register of the camera.

After these parameters are set in the register of the camera, the image transmission procedure is started, and the image data of the effective region designated above are transmitted over a network.

However, in the conventional image transmitting method as described above, the designation minimum unit (C', D') for designating the position (E, F) of the effective region for image transmission and the designation minimum unit (C', D') for designating the size (G, H) of the effective region, the same designation minimum unit is used. Accordingly, in case there is a restriction on the setting of either one of the designation minimum unit of position of the effective region or the designation minimum unit of the extent of the effective region, the restriction on one of them is also applied or extended to the other, and free designing cannot be carried out.

As an example, when an image of YUV 4:1:1 is transmitted, number of pixels in horizontal direction must be set to a multiple of 4. In this case, the designation minimum unit (for the extent and the position) of the effective region must be set to a multiple of 4. Then, problems arise that position of the effective region cannot be designated by one pixel unit.

DISCLOSURE OF THE INVENTION

To solve the above problems, it is an object of the present invention to provide an image transmitting method and an image transmitting system for carrying out the method, in which a designation minimum unit for designating the position of the effective region and a designation minimum unit for designating the size of an effective region are set in such manner that these are independent from each other, and even when there is a restriction on one of these designation minimum units, the restriction on one of them is not extended or applied to the other.

In the image transmitting method and the image transmitting system of the present invention, a designation minimum unit (I, J) for determining the position of the effective region is set independently and separately from a designation minimum unit (C, D) for determining the extent of an image region to be transmitted (hereinafter referred as "effective region").

According to the present invention, the designation minimum unit for determining the extent of the effective region and the designation minimum unit for determining the position of the effective region are set independently from each other. As a result, even when there is a restriction on one of the designation minimum unit for designating the position of the effective region and the designation minimum unit for designating the size of the effective region, it can be designed in such manner that the restriction on one of them is not extended or applied to the other.

The image transmitting method according to the present invention comprises the steps of setting the maximum value of an extent of an effective region in horizontal direction and vertical direction, a designation minimum unit of an extent of the effective region in horizontal direction and vertical direction, and a designation minimum unit of a position of the effective region in horizontal direction and vertical direction, setting a position and a size of the effective region designated from an external operation/control unit, and inputting only an image data included in the effective region and outputting it to outside. The values of the designation minimum unit of the extent of the effective region in horizontal direction and vertical direction are set to values independent and separate from the values of the designation minimum unit of the position of the effective region in horizontal direction and vertical direction. Even when there is restriction on one of the designation minimum unit for designating the position of the effective region or the designation minimum unit for designating the size of the effective region, it can be designed in such manner that the restriction on one of them is not extended or applied to the other.

In the image transmitting method of the present invention, the designation minimum unit of the position of the effective region is set to a value smaller than the designation minimum unit of the extent of the effective region. Because the designation minimum unit of the position of the effective region is set to a value smaller than the designation minimum unit of the extent of the effective region, and this makes it possible to set the shifting of the effective region in more elaborate manner.

The image transmitting system of the present invention comprises image acquisition means for converting an image input obtained by photographing to a digital electric signal, transmission means for processing the digital electric signal received from the image acquisition means and for outputting pixel data of the effective region to be transmitted to an external device, and transmission control means for supplying an effective pixel value setting signal for setting to transmit pixel data based on a command from an external operation/control unit to the transmission means. The transmission control means is designed to hold the maximum value of the extent of the effective region, the designation minimum unit of the extent of the effective region, and the designation minimum unit of the position of effective region. The designation minimum unit for designating the position of the effective region is set separately from the designation minimum unit for designating the size of the effective region. As a result, the size of the effective region and the position of the effective region can be set without any restriction on each other.

In the image transmitting system of the present invention, the designation minimum unit of the extent of the effective region is set to a value independent and separate from the designation minimum unit of the position of the effective region. The designation minimum unit for designating the size of the effective region is set separately from the designation minimum unit for designating the position of the effective region. As a result, the size of the effective region and the position of the effective region can be set without receiving any restriction on each other.

In the image transmitting system of the present invention, the designation minimum unit of the position of the effective region is set to a value smaller than the designation minimum unit of the extent of the effective region. As a result, the designation minimum unit of the position of the effective region is set to a value smaller than the designation minimum unit of the extent of the effective region, and the shifting of the effective region can be set in more elaborate manner.

BRIEF DESCRIPTION OF THE DRAWINGS

FIG. 1A and FIG. 1B are used to explain a method for designating an arbitrary image region of a picture taken by a camera for transmission purpose. In particular, FIG. 1A is a drawing to indicate an effective region on a picture and dimension, and FIG. 1B indicates parameters for designating the effective region.

FIG. 4 shows the details of effective region judging means shown in FIG. 3. In particular.

FIG. 5 explains a designation method for designating an arbitrary image region on a picture taken by a camera. In particular.

BEST MODE FOR CARRYING OUT THE INVENTION

Figure 1A:
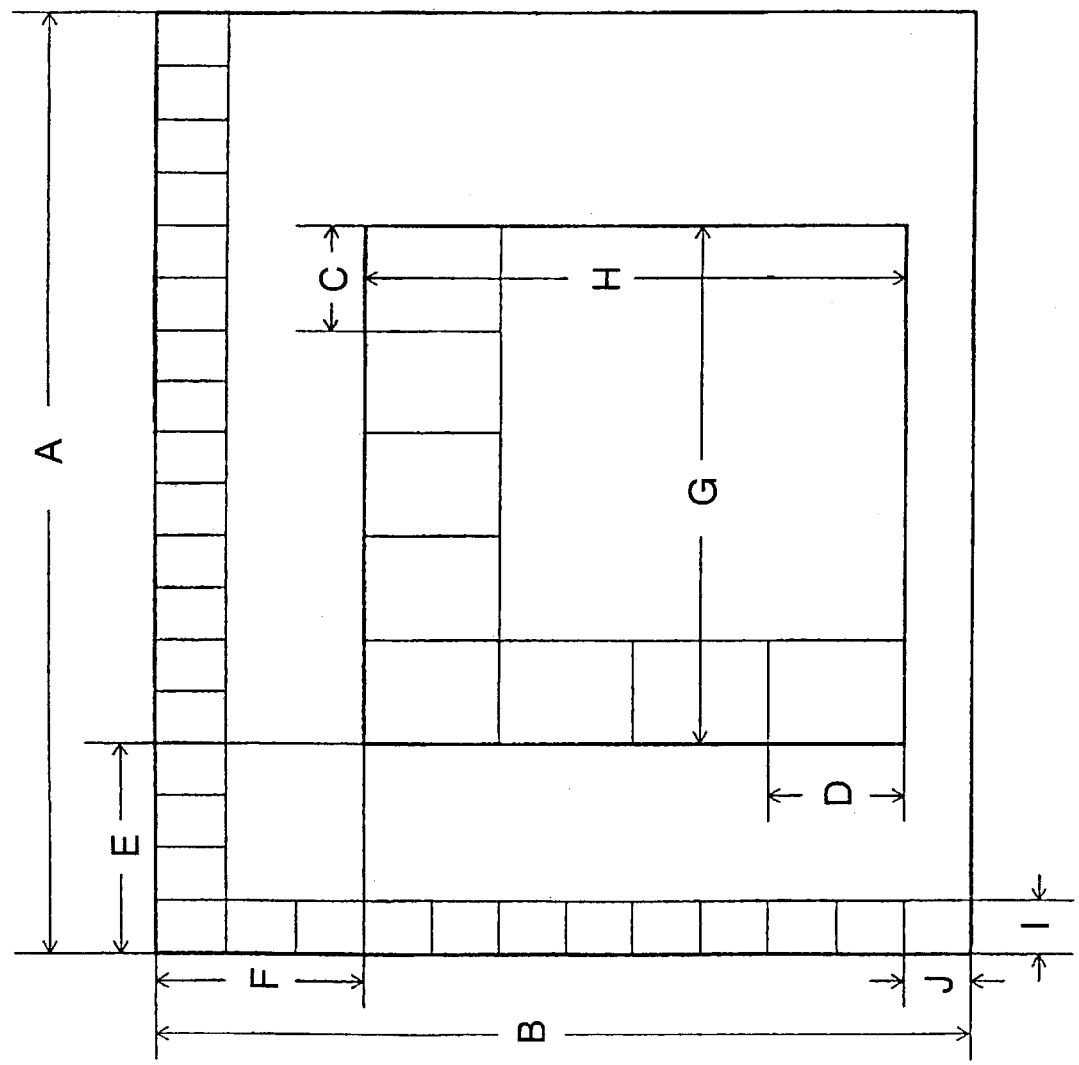

In the following, detailed description will be given on an embodiment of the present invention referring to the attached drawings FIG. 1 to FIG. 4. First, referring to FIG. 1A and FIG. 1, description will be given on basic concept of an image transmitting method and an image transmitting system in an embodiment of the present invention. FIG. 1 is used to explain a designation method for designating an arbitrary image region (all or a part) of a picture photographed by a camera for transmission purpose. FIG. 1A is a drawing to show an effective region on the picture and dimension, and FIG. 1B indicates parameters for designating the effective region.

Each of the extent and the size (represented by A, B, C, D, E, F, G, H, I, and J) of each portion of the effective region with the parameters given in FIG. 1B represents extent and size of a portion given by each of the corresponding symbols (A–J) in the image region shown in FIG. 1A. Specifically, a symbol "A" given in (1) of FIG. 1B indicates the maximum value of an extent of an effective region in horizontal direction, and "B" indicates the maximum value of an extent of an effective region in vertical direction. A symbol "C" given in (2) of FIG. 1B indicates a designation minimum unit of an extent of an effective region in horizontal direction, and "D" indicates a designation minimum unit of an extent of an effective region in vertical direction. A symbol "E" in (3) of FIG. 1B indicates a position of an effective region in horizontal direction, and "F" indicates a position of an effective region in vertical direction. A symbol "G" given in (4) of FIG. 1B indicates a size of an effective region in horizontal direction, and "H" indicates a size of an effective region in vertical direction. A symbol "I" given in (5) of FIG. 1B indicates a designation minimum unit of a position of an effective region in horizontal direction, and "J" indicates a designation minimum unit of a position of an effective region in vertical direction.

Next, referring FIG. 1A and FIG. 1B, description will be given on an image transmitting method in the above embodiment. First, on a memory (to be described later) on camera side, the following data are set: number of pixels of the maximum value of the extent of an effective region (A: horizontal direction; B: vertical direction), number of pixels of a designation minimum unit of the extent of the effective region (C: horizontal direction; D: vertical direction), and number of pixels of a designation minimum unit of a position of an effective region (I: horizontal direction; J: vertical direction). An operation/control unit (any type of operation or control means such as a personal computer) requesting transmission of an image region inquires and acquires data from the camera.

Based on the designation minimum units C and D on an extent of the effective region acquired, the operation/control unit determines a size (G: horizontal direction; H: vertical direction) of the effective region, which is an integral multiple of a designation minimum unit (C: horizontal direction; D: vertical direction) of the extent of the effective region and within the maximum value of the extent of the effective region. Based on the designation minimum unit (I: horizontal direction; J: vertical direction) of a position of the effective region acquired, the control unit determines a position of the effective region (E: horizontal direction; F: vertical direction) regardless of the designation minimum units C and D of the extent of the effective region, and these data are set in a register of the camera. An extent of a region (effective region) to be transmitted is determined by the size (G: horizontal direction; H: vertical direction) of the above effective region, and the position of the effective region on the picture is determined by the designation minimum unit (I: horizontal direction; J: vertical direction) of the position of the effective region.

The values of these parameters are set in the memory of transmission control means (to be described later), and an image transmitting procedure is started, and the effective region designated in the above, i.e. an image data in the effective region, is transmitted over a network.

In so doing, the minimum unit for position designation (hereinafter simply referred as "designation minimum unit") for designating the position of the effective region and the minimum unit for size designation (hereinafter simply referred as "designation minimum unit") for designating the size of the effective region are set independently from each other. As a result, even when there is a restriction on the setting of either one of these designation minimum units, this restriction is not extended or applied to the other, and free designing can be achieved.

Figure 2:
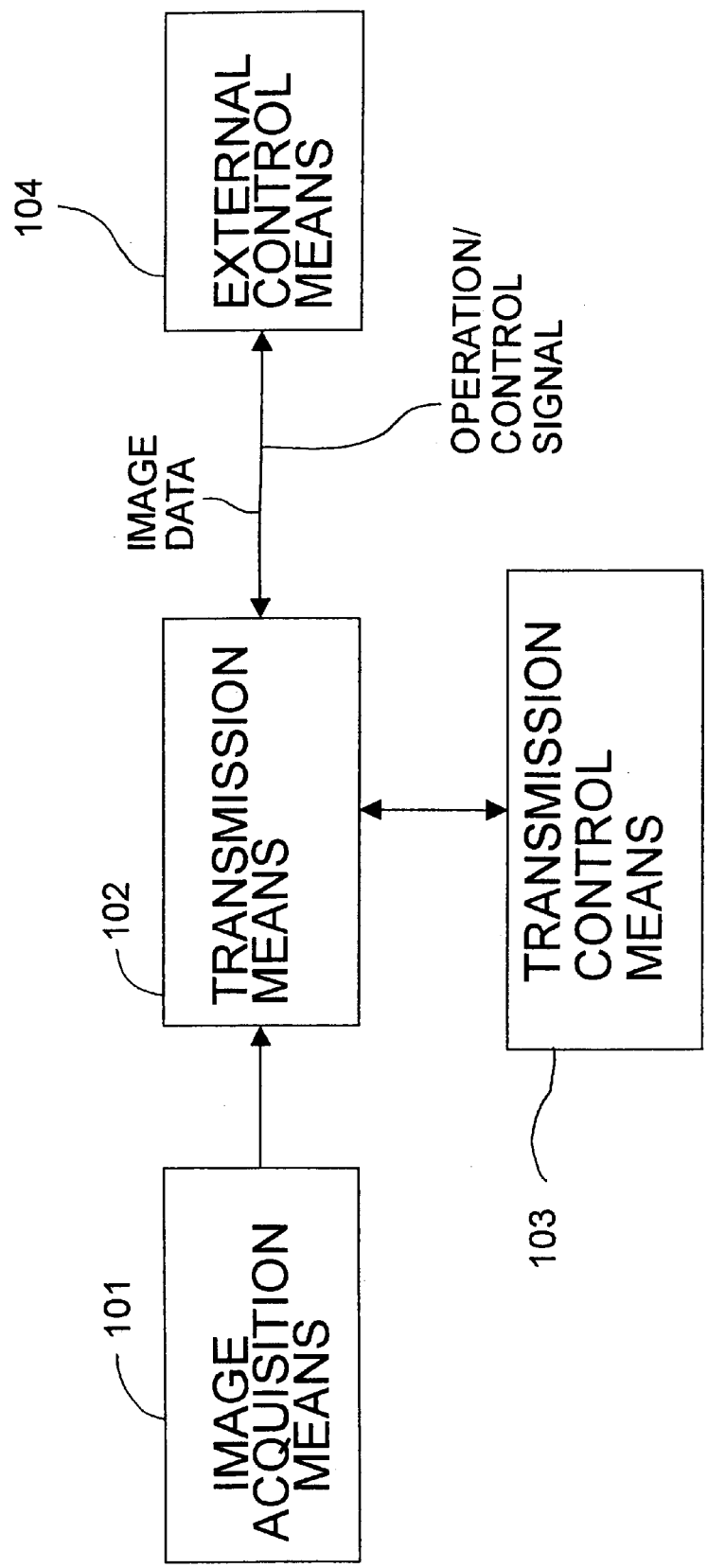
FIG. 2 is a block diagram showing general outline of an image transmitting system in an embodiment of the present invention.
Figure 3:
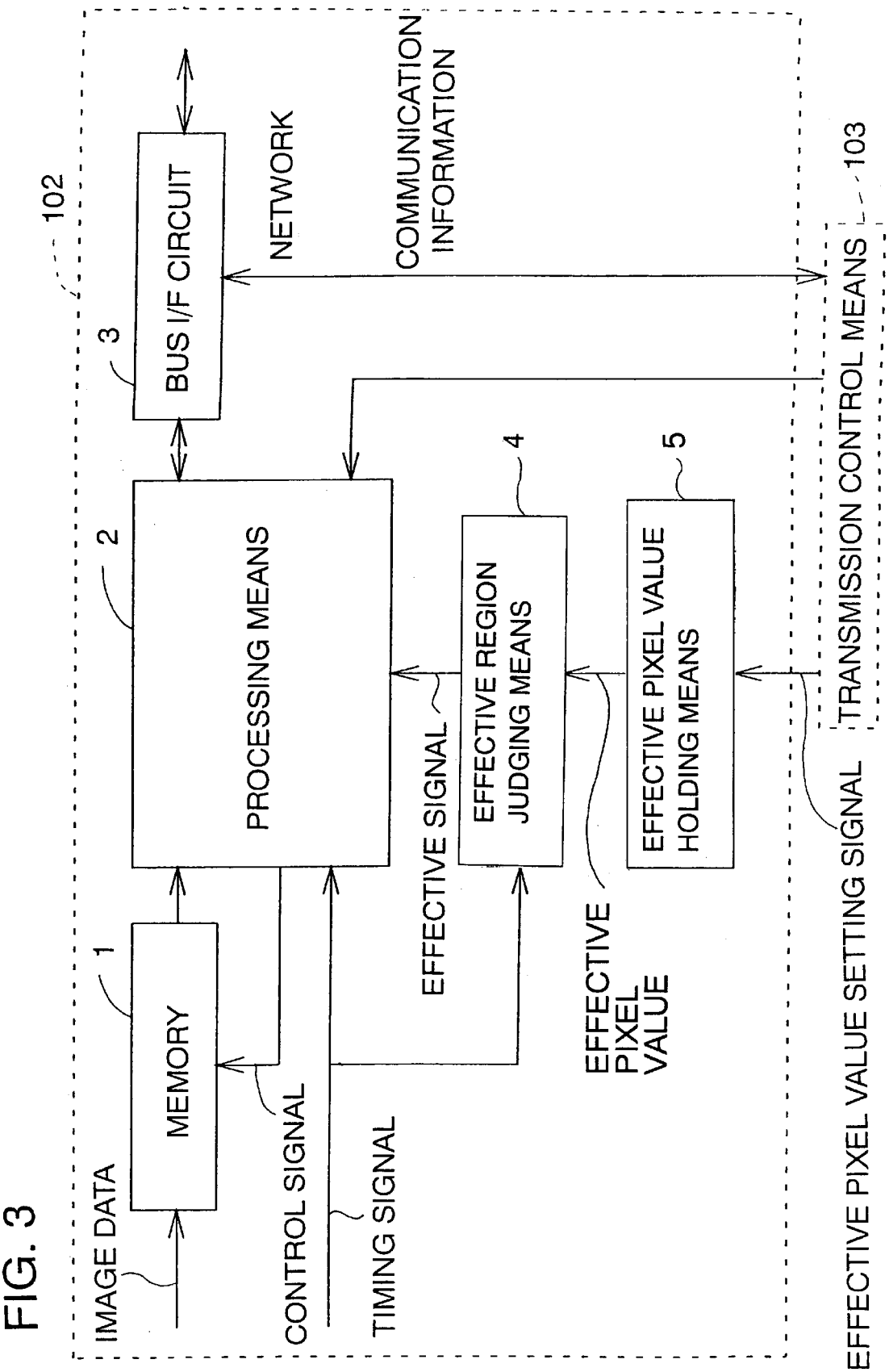
FIG. 3 is a detailed block diagram of transmission means shown in FIG. 2.
Figure 4A:
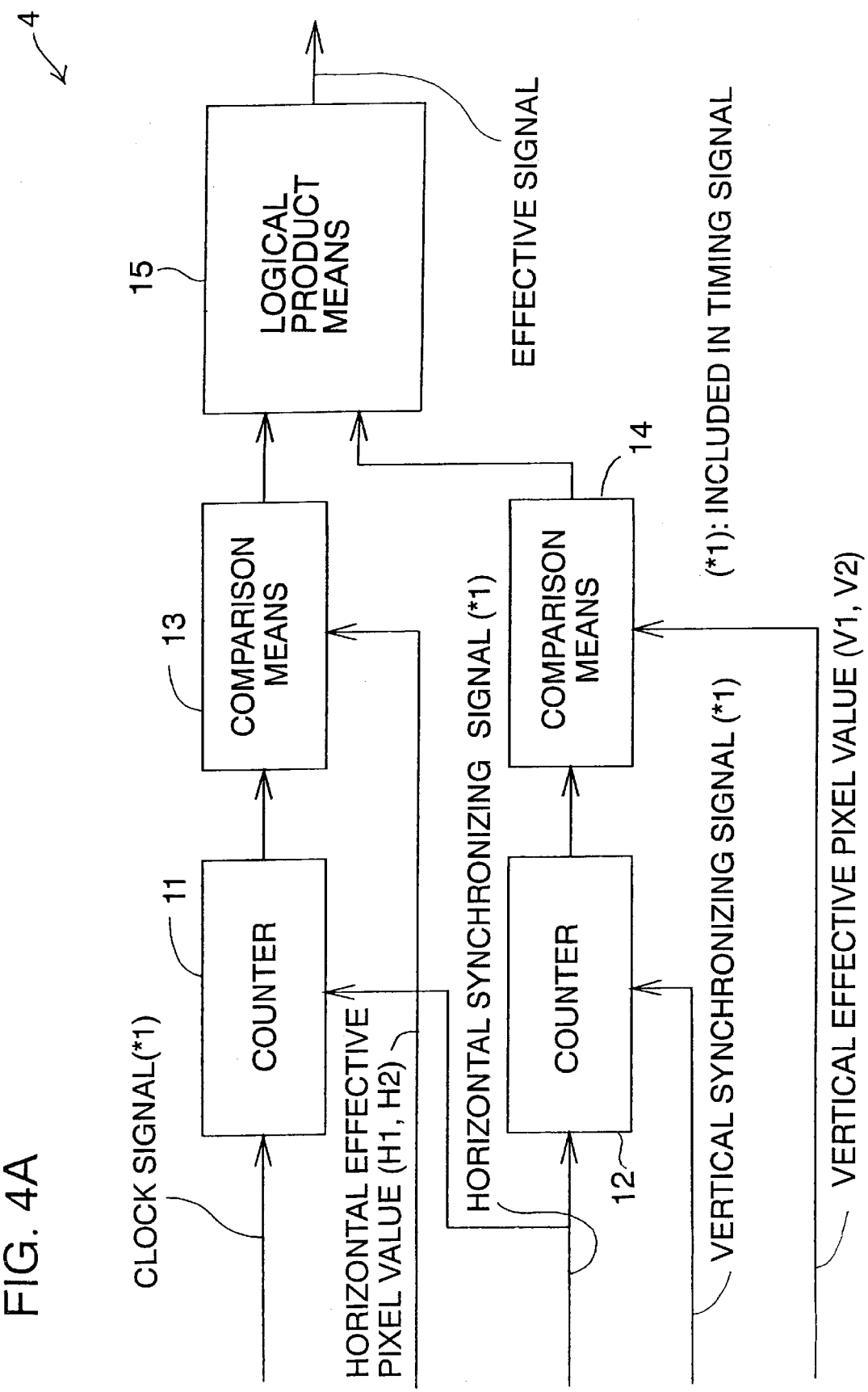
FIG. 4A is a block diagram of the effective region judging means.
Figure 4B:
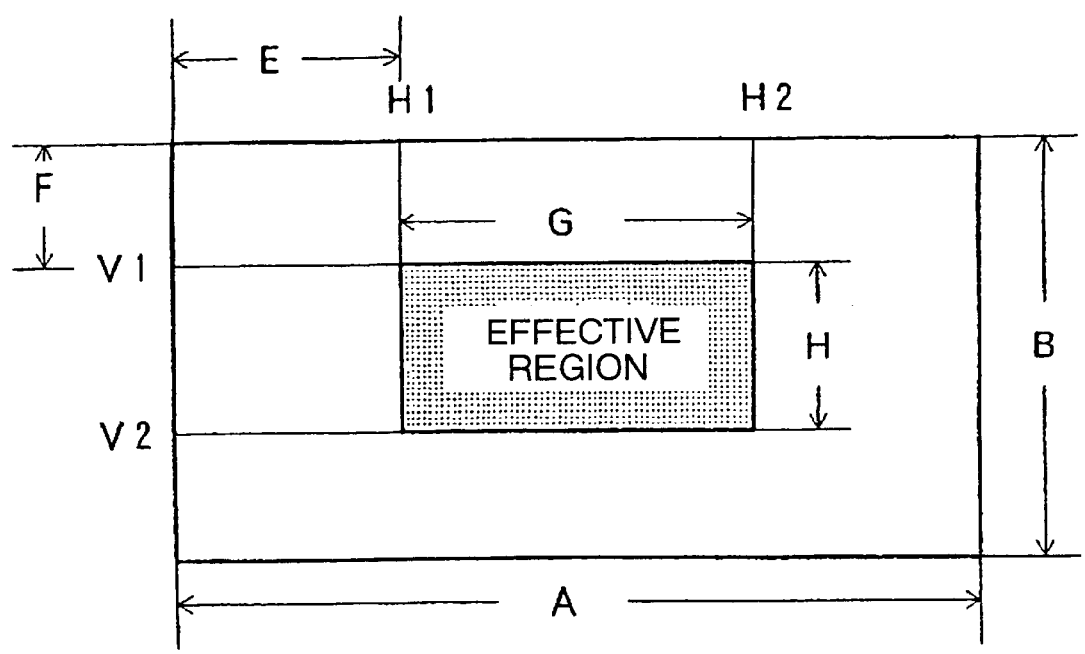
FIG. 4B is a drawing to show an effective region judged by the effective region judging means.
Figure 5A:
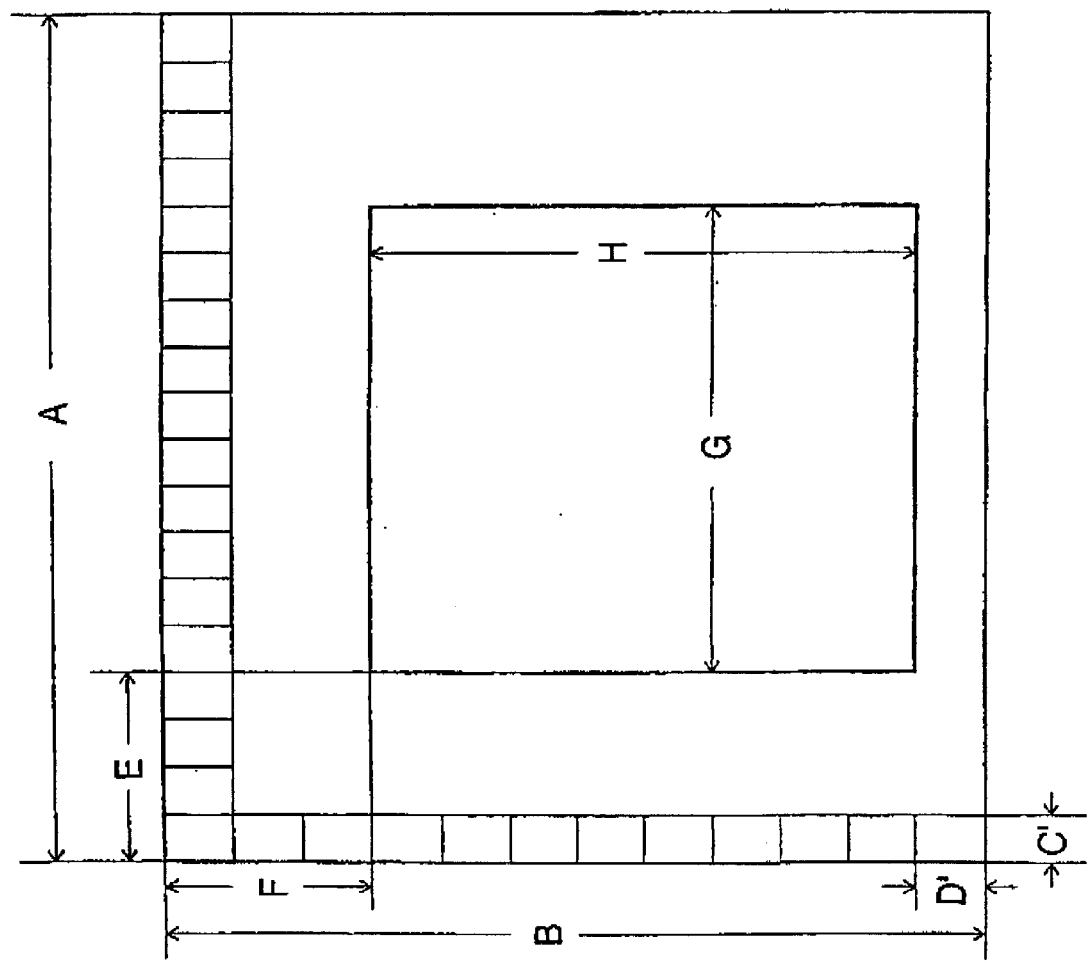
FIG. 5A is a drawing to show an effective region on a picture and dimension, and FIG. 5B indicates parameters for designating the effective region.

Next, referring to FIG. 2 to FIG. 4, description will be given on an image transmitting system for carrying out the image transmitting method in the embodiment of the present invention. FIG. 2 is a block diagram schematically showing an entire image transmitting system in the embodiment of the present invention, and FIG. 3 is a detailed block diagram of transmission means shown in FIG. 2. FIG. 4 shows the details of the effective region judging means shown in FIG. 3. FIG. 4A is a block diagram of the effective region judging means, and FIG. 4B shows an effective region judged by the effective region judging means.

First, referring to FIG. 2, the arrangement of the entire image transmitting system in the embodiment of the present invention will be described. In FIG. 2, reference numeral 101 denotes image acquisition means for converting an image taken by a camera and for outputting it, 102 indicates transmission means for processing a digital electric signal received from the image acquisition means 101 and for outputting only pixel data of the effective region to an external device (e.g. personal computer, monitor, recording system, etc.) connected to a network which requests such data. Reference numeral 103 is transmission control means for supplying a command from an external operation/control unit (shown as external control means in the figure) 104, i.e. an effective pixel value setting signal for setting an effective pixel to be transmitted to the transmission means 102 by an operation/control signal.

Next, referring to FIG. 2, description will be given on general outline of operation of the image transmitting system in the embodiment of the present invention. As described above, the transmission control means 103 has a memory (not shown). The maximum value (A, B) of an extent of the effective region and the designation minimum unit (C, D) of the extent of the effective region are set. Further, in the memory of the transmission control means 103, a position of the effective region (E, F) and a size (G, H) of the effective region are set according to a command from the external operation/control unit 104. Then, the image acquisition means 101 acquires an image taken by the camera, for instance, and this is converted to an image data as a digital electric signal, and it is outputted to the transmitting means 102. Based on the position of the effective region (E, F) and the size of the effective region (G, H) received from the transmission control means 103, the transmitting means 102 stores only the pixel data of the effective region in the memory at proper timing with the inputted image data. The memory which stores the data is outputted to outside as a packet.

Next, referring to FIG. 3, description will be given on a detailed arrangement of the transmission means 102 shown in FIG. 2. In FIG. 3, reference numeral 1 denotes a memory, which temporarily stores only the pixels in the effective region of an image data received from the image acquisition means 101, and 2 indicates processing means for temporarily storing each of the pixel data inputted to the memory 1 according the position of the effective region (E, F) and the size of the effective region (G, H) received from the transmission control means 103 at proper timing with a timing signal acquired from the image acquisition means 101. Reference numeral 3 is a bus I/F circuit for interfacing data and control signal between the external network and the operation/control unit 104 on one hand and the transmission control means 103 and the processing means 2 on the other hand.

Reference numeral 5 comprises a position memory, and it is effective pixel value holding means for receiving an effective pixel value setting signal to indicate address of an effective pixel designating the effective region from the transmission control means 103 and for holding the effective pixel values (H1 and H2, and V1 and V2 shown in FIG. 4B). Reference numeral 4 is effective region judging means for outputting an effective signal "1" to the processing means 2 when the image data sent from the image acquisition means 101 is within the effective region (given by H1, H2, V1 and V2). A timing signal shown in FIG. 3 is given from the image acquisition means of FIG. 2 together with the image data. Here, as shown in FIG. 4A, the timing signal includes a clock signal, a horizontal synchronizing signal and a vertical synchronizing signal, and these are synchronized with the image data, which serves as digital electric signal.

Next, referring to FIG. 3, operation of the transmission means 102 shown in FIG. 2 will be described. First, the transmission control means 103 outputs the maximum value (A, B) of the extent of the effective region as set in the memory (not shown), size designation minimum unit (C: horizontal direction; D: vertical direction) to designate the extent of the effective region, and position designation minimum unit (I: horizontal direction; D: vertical direction) to designate the position of the effective region based on a command from the external operation/control unit 104. The transmission control means 103 receives a communication information, i.e. a communication control information of the image data from the external operation/control unit 104 via the bus I/F circuit and acquires the position (E, F) of the effective region and the size (G, H) of the effective region contained therein. Here, the size designation minimum unit C in horizontal direction can be set to 4 pixels, for instance, and the size designation minimum unit D in vertical direction can be set to 1 pixel (1 horizontal line), for instance. On the other hand, the position designation minimum unit I in horizontal direction can be set to 1 pixel, for instance, and the position designation minimum unit J in vertical direction can be set to 1 pixel (1 horizontal line), for instance.

Based on the position (E, F) of the effective area and the size (G, H) of the effective region thus acquired, the transmission control means 103 outputs an effective pixel value setting signal including horizontal pixel values (H1, H2) and vertical effective pixel values (V1, V2) for specifying the effective region on the picture.

The horizontal effective pixel value indicates that it is effective between the positions H1 and H2, and the vertical effective pixel value indicates that it is effective between the positions V1 and V2. The effective pixel value holding means 5 holds the received effective pixel value and outputs it to the effective region judging means 4.

As described later in detail, the effective region judging means 4 counts each pixel on the picture according to the timing signal acquired from the image acquisition means 101 and outputs an effective signal "1" to the processing means when the position given by the count agrees with the position given by the received effective pixel values (H1, H2, V1, and V2). Because the processing means is synchronized by the same timing signal, the position where the effective signal "1" has been received can be identified. A control signal is sent immediately to the memory 1, and the pixel data corresponding to the effective signal "1" is stored in the memory 1.

Next, referring to FIG. 4A, description will be given on a detailed arrangement of the effective region judging means 4 shown in FIG. 3. In FIG. 4A, reference numeral 11 denotes a counter for receiving a clock signal and for counting pixels in horizontal direction (from 1 to n1) on the picture, and reference numeral 12 is a counter for counting horizontal lines in vertical direction (from 1 to n2) on the picture. Reference numeral 13 is comparison means for comparing the count value of the counter 11 with the horizontal effective pixel values (H1, H2) from the effective pixel value holding means 5 and for outputting a horizontal effective signal "1" in case the count value is within the range from H1 to H2. The clock signal has number of pulses (frequencies) to match the number of pixels (rate) on the horizontal line.

Reference numeral 14 denotes comparison means for comparing the count value of the counter 12 with the vertical effective pixel values (V1, V2) from the effective pixel value holding means 5 and for outputting a vertical effective signal "1" in case the count value is within the range from V1 to V2. Reference numeral 15 is logical product means for obtaining a logical product of output signals of the comparison means 13 and the comparison means 14 and for outputting an effective signal "1" in case both output signals are logic "1".

Next, referring to FIG. 4A and FIG. 4B, operation of the effective region judging means shown in FIG. 4A will be described. First, in FIG. 4B, in the maximum value (A: horizontal direction; B: vertical direction) of the extent of the effective region in the entire image region photographed, an effective region is designated, which has the position (E, F) of the effective region as a starting point (given by the horizontal effective pixel value H1 and the vertical effective pixel value V1) and which is defined by the horizontal effective pixel values (H1, H2) showing the position of the effective region in horizontal direction and by the vertical effective pixel values (V1, V2) showing the position of the effective region in vertical direction. The horizontal effective pixel values (H1, H2) are count values counting the pixels from the left end of the image region defined by the maximum values A and B of the extent of the effective region. The vertical effective pixel values (V1, V2) are count values counting the pixels from the upper end of the image region. Specifically, a left upper corner of the image region defined by the maximum values A and B of the extent of the effective region is used as a reference point, and number of pixels is counted. The reference point is not limited to the left upper corner, but it can be set at any point as desired. As described later, when the effective region is counted, the effective signal "1" is outputted from the effective region judging means 4.

Next, in FIG. 4A, the counter 11 outputs a count value, which is counted at all times (counted up) by the clock signal contained in the timing signal and indicates address value of the pixels in horizontal direction. When it reaches the maximum value (A) in horizontal direction of the extent of the region shown in FIG. 4B, it is reset by the horizontal synchronizing signal and returns to the initial value in horizontal direction of the extent of the region. Also, the counter 12 outputs a count values, which is counted by the horizontal synchronizing signal contained in the timing signal (photographed pixels are counted in vertical direction) and indicates address value of the pixels in vertical direction. When the maximum value (B) in vertical direction of the extent of the effective region shown in FIG. 4B is reached, it is reset by the vertical synchronizing signal and returns to the initial value in vertical direction of the extent of the region.

The comparison means 13 receives the horizontal effective pixel values (H1, H2) from the effective pixel value holding means 5, monitors and compares with the count value from the counter 11, and outputs a horizontal effective signal "1" in case the count value is within the range from H1 to H2. Further, the comparison means 14 receives the vertical effective pixel values (V1, V2) from the effective pixel value holding means 5, monitors and compares with the count value from the counter 12, and outputs a vertical effective signal "1" in case the count value is within the range from V1 to V2. The logical product means 15 receives the horizontal effective signal and the vertical effective signal and, in case both signals are "1", outputs an effective signal "1", showing that the count is within the effective region, to the processing means 2.

As described above, only when the pixel data currently inputted by the count of the pixel values is within the range of the effective pixel values (H1, H2, V1, and V2), an effective signal is generated to the processing means 2, and it is allowed to write the pixel data within this range to the memory 1. In case a data meeting the packet size comes into existence in the memory 1, the image data is sent over a network as a packet via the bus I/F circuit.

(Other Embodiments)

In the above embodiment, description has been given under the assumption that the position designation minimum unit (e.g. 1 pixel) can be smaller than the size designation minimum unit (e.g. 4 pixels), but this relation of the value may be reversed. That is, it is possible to set the size designation minimum unit (e.g. 4 pixels) to a value smaller than the position designation minimum value (e.g. 8 pixels). In case the position designation minimum unit is smaller than the size designation minimum unit, the setting of the position can be performed in more elaborate manner. On the other hand, in case the size designation minimum unit is smaller than the position designation minimum unit, the setting of the size can be performed in more elaborate manner.

Further, it is possible to fix a reference position of the effective region to a reference position of 2-dimensional image region at all times and to change only the extent of the effective region. Here, it is assumed that a left upper corner in 2-dimensional image region is regarded as a reference point and the effective region is defined by horizontal and vertical distances from this point. Then, by setting and storing the position designation minimum unit as the same value as the maximum value of the effective region and by sending it to the external operation/control unit 104, it is possible to know that the position serving as a reference of the effective region is always the above reference point. Because the size designation minimum value is a value independent from the position designation unit, the size designation can be performed according to the maximum value of the effective region and to the size designation minimum unit.

INDUSTRIAL APPLICABILITY

As described above, in the present invention, the designation minimum unit for determining the extent of the effective region and the designation minimum unit for determining the position of the effective region are set independently from each other. As a result, even when there is a restriction on the setting of one of the designation minimum unit for designating the position of the effective region or the designation minimum unit for designating the size of the effective region, it is possible to set in such manner that the restriction on one of them is not extended or applied to the other.

According to the present invention, the designation minimum unit for determining the extent of the effective region and the designation minimum unit for determining the position of the effective region are set independently from each other. As a result, it is possible to set the designation minimum unit "I, J" for determining the position of the effective region to a value smaller than the designation minimum unit "C, D" for determining the extent of the effective region in order to more elaborately set the position of the effective region. Also, it is possible to design freely, i.e. to set the designation minimum unit "C, D" for determining the extent of the effective region to a value smaller than the designation minimum unit "I, J" for determining the position of the effective region.

Further, by setting the position designation minimum unit of the effective region to the same value as the maximum value of the effective region, the reference position of the effective region can be fixed and the effective region can be set simply depending on the extent of the effective region.

What is claimed is:

1. An image transmitting method, to be applied in a region corresponding to a part or all of a 2-dimentional image and in an effective region where an extent of the region in horizontal direction and vertical direction is variable, the maximum value of the extent in horizontal direction and vertical direction of the effective region is set in advance, and a size designation minimum unit for designating an extent of the effective region in horizontal direction and vertical direction and a position designation minimum unit are designed in advance independently from each other and without exerting influence on each other, said position designation minimum unit designates a position to a reference point of said 2-dimensional image of said effective region defined as distances in horizontal direction and vertical direction from the reference point respectively, whereby said method comprises the steps of:

holding the maximum value of said extent, said size designation minimum unit, and said position designation minimum unit;

sending the maximum value of said extent being held, said size designation minimum unit, and said position designation minimum unit to an external operation/control unit in response to a request from the external operation/control unit;

receiving an information when an extent and a position of said effective region are designated using the maximum value of said extent, said size designation minimum unit, and said position designation minimum unit; and outputting only the image data included in said effective region specified according to the received information on the extent and the position of said effective region.

2. An image transmitting system, comprising:

image acquisition means for converting an image signal obtained by photographing a 2-dimensional image to a digital electric signal;

transmission means for processing said digital electric signal from said image acquisition means and for outputting a pixel data of an effective region to an external device, said region corresponding to a part or all of said 2-dimentional image and having a variable extent in horizontal direction and in vertical direction; and transmission control means for controlling said transmitting means, whereby:

maximum value of the extent in horizontal direction and vertical direction of said effective region is set and held in advance in said transmission control means, and each of a size designation minimum unit for designating the extent in horizontal direction and vertical direction of said effective region and a position designation minimum unit for designating position of the effective region to a reference point of said 2-dimensional image defined as distances in horizontal direction and vertical direction from said reference point are set and held in advance in said transmission control means so that said size designation minimum unit and said position designation minimum unit are independent from each other and without exerting influence on each other; and said transmission control means and said transmission means transmit the maximum value of said extent, said size designation minimum unit, and said position designation minimum unit to an external operation/control unit upon a request of the external operation/control unit, and when the extent and the position of said effective region are designated using the maximum value of said extent, said size designation minimum unit, and said position designation minimum unit by said external operation/control unit, the information is received and only the image data included in said effective region specified according to the extent and the position of said effective region as received are outputted.

3. An image transmitting system according to claim 2, wherein said system comprises:

effective pixel value holding means for holding a range of pixel number in horizontal direction and in vertical direction from said reference position when said transmission means receives a signal for specifying said effective region from said transmission control means;

effective region judging means for judging that the range of pixel number held in said effective pixel value holding means and the pixel data of said digital electric signal currently inputted in response to the timing signal synchronized with said digital electric signal are within said effective region specified by the range of said pixel number; and a memory for storing only the pixel data in said effective region in response to the result of judgment of said effective region judging means.

4. An image transmitting system according to claim 3, wherein said effective region judging means comprises a first counter for counting number of pixels in horizontal direction in response to the clock signal, a second counter for counting number of horizontal lines in response to the horizontal synchronizing signal of said digital electric signal, and first comparison means for comparing the count of said first counter with said horizontal effective pixel value;

second comparison means for comparing the count of said second counter with said vertical effective pixel value; and logical product means for generating a signal indicating that it is effective when each of the counts is with the range of each of the effective pixel values in the result of comparison of both means in response to the result of comparison by said first comparison means and said second comparison means.

5. An image transmitting system, comprising:

image acquisition means for converting an image signal obtained by photographing a 2-dimensional image to a digital electric signal;

transmission means for processing said digital electric signal from said image acquisition means and for outputting a pixel data of an effective region to an external device, said region corresponding to a part or all of said 2-dimensional image and having a variable extent in horizontal direction and in vertical direction; and transmission control means for controlling said transmitting means, whereby:

maximum value of the extent in horizontal direction and vertical direction of said effective region is set and held in advance in said transmission control means, and each of the size designation minimum unit for designating the extent in horizontal direction and vertical direction of said effective region and position designation minimum unit for designating position of the effective region to a reference point of said 2-dimensional image defined as distances in horizontal direction and vertical direction from said reference point are set and held in advance in said transmission control means so that the value of said position designation minimum unit is set to a value smaller than the value of said size designation minimum unit; and said transmission control means and said transmission means transmit the maximum value of said extent, said size designation minimum unit, and said position designation minimum unit to an external operation/control unit upon a request of the external operation/control unit, and when the extent and the position of said effective region are designated using the maximum value of said extent, said size designation minimum unit, and said position designation minimum unit by said external operation/control unit, the information is received and only the image data included in said effective region specified according to the extent and the position of said effective region as received are outputted.

6. An image transmitting system according to claim 5 wherein said system comprises:

effective pixel value holding means for holding a range of pixel number in horizontal direction and in vertical direction from said reference position when said transmission means receives a signal for specifying said effective region from said transmission control means;

effective region judging means for judging that the range of pixel number held in said effective pixel value holding means and the pixel data of said digital electric signal currently inputted in response to the timing signal synchronized with said digital electric signal are within said effective region specified by the range of said pixel number; and a memory for storing only the pixel data in said effective region in response to the result of judgment of said effective region judging means.

7. An image transmitting system according to claim 6, wherein said effective region judging means comprises a first counter for counting number of pixels in horizontal direction in response to the clock signal, a second counter for counting number of horizontal lines in response to the horizontal synchronizing signal of said digital electric signal, and first comparison means for comparing the count of said first counter with said horizontal effective pixel value;

second comparison means for comparing the count of said second counter with said vertical effective pixel value; and logical product means for generating a signal indicating that it is effective when each of the counts is with the range of each of the effective pixel values in the result of comparison of both means in response to the result of comparison by said first comparison means and said second comparison means.

8. An image transmitting system, comprising:

image acquisition means for converting an image signal obtained by photographing a 2-dimensional image to a digital electric signal;

transmission means for processing said digital electric signal from said image acquisition means and for outputting a pixel data of an effective region to an external device, said region corresponding to a part or all of said 2-dimensional image and having a variable extent in horizontal direction and in vertical direction; and transmission control means for controlling said transmitting means, whereby:

maximum value of the extent in horizontal direction and vertical direction of said effective region is set and held in advance in said transmission control means, and each of a size designation minimum unit for designating the extent in horizontal direction and vertical direction of said effective region and a position designation minimum unit for designating position of the effective region to a reference point of said 2-dimensional image defined as distances in horizontal direction and vertical direction from said reference point are set and held in advance in said transmission control means so that the value of said size designation minimum value is value smaller than the value of said position designation minimum value; and said transmission control means and said transmission means transmit the maximum value of said extent, said size designation minimum unit, and said position designation minimum unit to an external operation/control unit upon a request of the external operation/control unit, and when the extent and the position of said effective region are designated using the maximum value of said extent, said size designation minimum unit, and said position designation minimum unit by said external operation/control unit, the information is received and only the image data included in said effective region specified according to the extent and the position of said effective region as received are outputted.

9. An image transmitting system according to claim 8, wherein said system comprises:

effective pixel value holding means for holding a range of pixel number in horizontal direction and in vertical direction from said reference position when said transmission means receives a signal for specifying said effective region from said transmission control means;

effective region judging means for judging that the range of pixel number held in said effective pixel value holding means and the pixel data of said digital electric signal currently inputted in response to the timing signal synchronized with said digital electric signal are within said effective region specified by the range of said pixel number; and a memory for storing only the pixel data in said effective region in response to the result of judgment of said effective region judging means.

10. An image transmitting system according to claim 9, wherein said effective region judging means comprises a first counter for counting number of pixels in horizontal direction in response to the clock signal, a second counter for counting number of horizontal lines in response to the horizontal synchronizing signal of said digital electric signal, and first comparison means for comparing the count of said first counter with said horizontal effective pixel value;

second comparison means for comparing the count of said second counter with said vertical effective pixel value; and logical product means for generating a signal indicating that it is effective when each of the counts is with the range of each of the effective pixel values in the result of comparison of both means in response to the result of comparison by said first comparison means and said second comparison means.

11. An image transmitting system, comprising:

image acquisition means for converting an image signal obtained by photographing a 2-dimensional image to a digital electric signal;

transmission means for processing said digital electric signal from said image acquisition means and for outputting a pixel data of an effective region to an external device, said region corresponding to a part or all of said 2-dimensional image and having a valuable extent in horizontal direction and in vertical direction; and transmission control means for controlling said transmitting means, whereby:

maximum value of the extent in horizontal direction and vertical direction of said effective region is set and held in advance in said transmission control means, and each of a size designation minimum unit for designating the extent in horizontal direction and vertical direction of said effective region and a position designation minimum unit for designating position of the effective region to a reference point of said 2-dimensional image defined as distances in horizontal direction and vertical direction from said reference point are set and held in advance in said transmission control means so that the value of said position designation minimum unit is set to the same value as the maximum value of said extent; and said transmission control means and said transmission means transmit the maximum value of said extent, said size designation minimum unit, and said position designation minimum unit to an external operation/control unit upon a request of the external operation/control unit, and when the extent and the position of said effective region are designated using the maximum value of said extent, said size designation minimum unit, and said position designation minimum unit by said external operation/control unit, the information is received and only the image data included in said effective region specified according to the extent and the position of said effective region as received are outputted.

12. An image transmitting system according to claim 11, wherein said system comprises:

effective pixel value holding means for holding a range of pixel number in horizontal direction and in vertical direction from said reference position when said transmission means receives a signal for specifying said effective region from said transmission control means;

effective region judging means for judging that the range of pixel number held in said effective pixel value holding means and the pixel data of said digital electric signal currently inputted in response to the timing signal synchronized with said digital electric signal are within said effective region specified by the range of said pixel number; and a memory for storing only the pixel data in said effective region in response to the result of judgment of said effective region judging means.

13. An image transmitting system according to claim 12, wherein said effective region judging means comprises a first counter for counting number of pixels in horizontal direction in response to the clock signal, a second counter for counting number of horizontal lines in response to the horizontal synchronizing signal of said digital electric signal, and first comparison means for comparing the count of said first counter with said horizontal effective pixel value;

second comparison means for comparing the count of said second counter with said vertical effective pixel value; and logical product means for generating a signal indicating that it is effective when each of the counts is with the range of each of the effective pixel values in the result of comparison of both means in response to the result of comparison by said first comparison means and said second companion means.

* * * * *